United States Patent Office 3,060,206
Patented Oct. 23, 1962

3,060,206
2,4-DISULFAMYL-5-ALKOXY-ANILINE
Frederick C. Novello, Berwyn, Pa., assignor to Merck
& Co., Inc., Rahway, N.J., a corporation of New
Jersey
No Drawing. Filed Sept. 27, 1960, Ser. No. 58,620
2 Claims. (Cl. 260—397.7)

This invention is concerned with novel disulfamyl-aniline compounds having the general structural formula

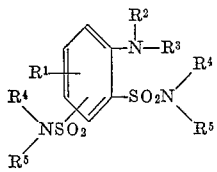

and their non-toxic salts, wherein the radical —$SO_2NR^4R^5$ is attached to one of the positions 4 and 5, and the floating radical $R^1$ is attached to one of the unsubstituted positions 6, 5, and 4, and wherein $R^1$ is lower alkoxy advantageously containing from 1 to 5 carbon atoms in the alkyl portion of the radical; $R^2$ is hydrogen or lower alkyl having advantageously from 1 to 5 carbon atoms; $R^3$ is hydrogen, a lower alkyl radical having advantageously from 1 to 5 carbon atoms, a lower alkanoyl advantageously a straight or branched chain alkanoyl radical having from 1 to 12 carbon atoms such as the formyl, acetyl, caproyl, capryl, lauroyl, and the like radicals, mononuclear aroyl such as benzoyl or mononuclear aryl-lower alkanoyl having advantageously from 1 to 3 carbon atoms in the alkanoyl moiety such as phenylacetyl, phenylpropionyl, cinnamoyl and the like or similar aryl-lower ankanoyl radicals wherein a substituent is attached to the aryl moiety, such as a substituent selected from a halogen, lower alkyl, lower alkoxy, and the like; and

is an unsubstituted or substituted amino radical and if substituted $R^4$ and $R^5$ being either alike or dissimilar radicals selected respectively from lower alkyl either straight or branched chain and having advantageously from 1 to 6 carbon atoms, lower alkanoyl having preferably from 1 to 3 carbon atoms or

can represent a heterocyclic ring such as 5- or 6-membered ring selected from the 1-pyrrolidyl, 1-piperidyl, 4-morpholinyl and the like radicals.

The new compounds of this invention are useful chemotherapeutic agents principally because of their diuretic and/or natriuretic properties. The compounds can be administered in therapeutic dosages in conventional vehicles as in the form of a tablet as these compounds are effective upon oral administration as well as upon injection. As the compounds of this invention also are readily soluble in a dilute alkaline medium and in polyethylene glycol solutions, injectable solutions can be prepared by dissolving the desired compound in the selected medium to which preservatives can be added if desired.

The new compounds of this invention also are useful in preparing novel benzothiadiazine-1,1-dioxide compounds which also possess diuretic and/or natriuretic properties and which are the subject of my U.S. Patent No. 2,809,194.

The disulfamylaniline derivatives of this invention can be prepared by a variety of methods. Two processes which have been found to be particularly well adapted to the preparation of these compounds can be illustrated as follows:

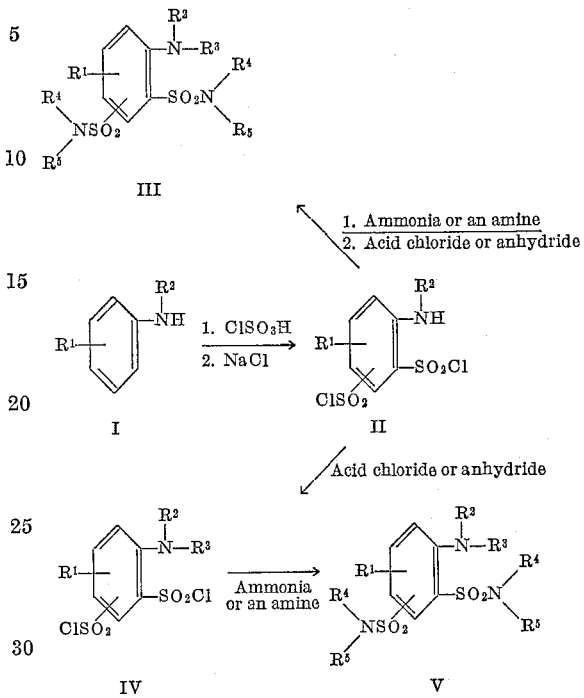

Few of the disulfonyl chloride compounds, II, are known, and those which have not been described in the literature can be prepared readily by chlorosulfonation of the selected aniline compound, I, preferably in the presence of an alkali metal halide, for example sodium, potassium or lithium chloride. For all practical purposes, sodium chloride can be used as it is readily available, cheap, and in its presence the reaction proceeds quite smoothly. As the reaction between these ingredients generally is quite vigorous, it is preferred to add the aniline derivative to the chlorosulfonic acid dropwise with stirring and cooling. After all of the aniline derivative has been added, the alkali metal chloride is added in small portions to allow for the evolution of hydrogen chloride at a moderate rate. Following this, the mixture is heated at between about 100–200° C. preferably in an oil bath.

The disulfonyl chloride, II, thus obtained then can be converted to the disulfamyl derivative, III, by treatment with ammonia or a primary or secondary amine by well known methods. If desired, following the reaction with ammonia or a primary or secondary amine the resulting product can be reacted with the desired acylating agent advantageously by heating on a steam bath to form the corresponding acylated aniline compound. The acylating agent can be any of the agents described below for this purpose.

Alternatively, the disulfonyl chloride compound, II, can be acylated with an organic acid chloride or anhydride, the acid advantageously being selected from a lower alkanoic acid such as acetic acid, propionic acid, caproic acid, capric acid, stearic acid and the like, or a mononuclear aryl-monocarboxylic acid or a mononuclear aryl-lower alkanoic acid such as benzoic acid, phenylacetic acid, phenylpropionic acid, cinnamic acid, and the like. This reaction proceeds quite smoothly with moderate heating on the steam bath yielding the N-acyl-disulfonyl chloride derivative, IV.

The acylated compound, IV, then can be converted to the corresponding amide by treatment with ammonia or a primary or secondary amine by the method described above for conversion of the disulfonyl chloride, compound II, to the disulfamyl compound, III.

The desired salt of the disulfamylaniline compounds of this invention wherein $R^4$ or $R^5$ is hydrogen can be prepared advantageously by dissolving the selected compound in an aqueous or alcoholic solution of an alkali metal hydroxide, and, if desired, isolating the salt by evaporating the solvent. Any of the conventional alkali metal salts such as sodium, potassium, lithium or the like salt, can be prepared by this method or by other methods known to organic chemists.

The preparation of the compounds is more fully described in the following examples. It is to be understood, however, that the examples are illustrative of the compounds embraced by this invention and of the methods for their preparation and are not to be construed as limiting the invention to the particular compounds or methods specifically described.

EXAMPLE 1

*2,4-Disulfamyl-5-Methoxyaniline*

Chlorosulfonic acid (150 ml.) is added dropwise over 30 minutes with stirring to 24.6 g. (0.2 mole) of m-anisidine cooled in an ice bath. After addition of chlorosulfonic acid is complete, 140 g. of sodium chloride is added portionwise over 1 hour. The mixture is heated for 2 hours on the steam bath and then for 3 hours in an oil bath, 150–160° C., cooled thoroughly in an ice bath and treated with 500 ml. of ice water. The product is taken up in ether, washed with water, dried and the solvent evaporated on the steam bath. The residue is cooled in an ice bath and treated with 100 ml. of 28% ammonium hydroxide. The precipitate is collected on the filter, washed with water and recrystallized from water to give 2,4-disulfamyl-5-methoxyaniline as colorless needles, M.P. 252–253° C.

*Analysis.*—Calculated for $C_7H_{11}N_3O_5S_2$: C, 29.89; H, 3.94; N, 14.94. Found: C, 30.12; H, 4.09; N, 14.93.

EXAMPLE 2

*5-Propoxy-2,4-Di-(4-Morpholinylsulfonyl)-N-Butylaniline*

By replacing the m-anisidine employed in Example 1 by an equimolecular quantity of m-propoxy-N-butylaniline and following substantially the same procedure described for the chlorosulfonation of the aniline derivative there described, there is obtained 5-propoxy-N-butylaniline-2,4-disulfonyl chloride. After separation by filtration, five grams of the thus obtained disulfonyl chloride is added portionwise to morpholine (50 ml.) and heated for approximately one hour on the steam bath. After cooling to room temperature, the solid product is collected on the filter, washed with water and crystallized from a mixture of alcohol and water yielding 5-propoxy-2,4-di-(4-morpholinylsulfonyl)-N-butylaniline.

EXAMPLE 3

*2,4-Di-(N,N-Dimethylsulfamyl)-5-Propoxy-N-Cinnamoylaniline*

By replacing the m-anisidine employed in Example 1 by an equimolecular quantity of m-propoxyaniline and following substantially the same procedure described for the chlorosulfonation of the aniline derivative there described, there is obtained 5-propoxyaniline-2,4-disulfonyl chloride. Five grams of the thus obtained disulfonyl chloride is dissolved in cinnamoyl chloride (10 ml.) and heated briefly on the steam bath. The reaction mixture then is allowed to cool to room temperature and the solid product thus formed collected on the filter. After crystallization from a mixture of benzene-hexane, 5-propoxy-N-cinnamoylaniline-2,4-disulfonyl chloride is obtained. After separation by filtration, the disulfonyl chloride is added portionwise to 25% aqueous dimethylamine (50 ml.) and heated for approximately one hour on the steam bath. After cooling to room temperature, the solid product is collected on the filter and washed with water yielding 2,4-di-(N,N-dimethylsulfamyl)-5-propoxy-N-cinnamoylaniline.

EXAMPLE 4

*2,4-Disulfamyl-5-Methoxy-N-Dichloroacetylaniline*

By replacing the 5-propoxyaniline-2,4-disulfonyl chloride and the cinnamoyl chloride employed in Example 3 by equivalent quantities of 5-methoxyaniline-2,4-disulfonyl chloride and dichloroacetyl chloride and following substantially the same procedure described in Example 3, there is obtained 2,4-disulfamyl-5-methoxy-N-dichloroacetylaniline.

EXAMPLE 5

*2,4-Disulfamyl-5-Methoxy-N-Caproylaniline*

By replacing the 5-propoxyaniline-2,4-disulfonyl chloride and the cinnamoyl chloride employed in Example 3 by equivalent quantities of 5-methoxyaniline-2,4-disulfonyl chloride and caproyl chloride and following substantially the same procedure described in Example 3, there is obtained 2,4-disulfamyl-5-methoxy-N-caproylaniline.

EXAMPLE 6

*2,4-Disulfamyl-5-Methoxy-N-Phenylacetylaniline*

By replacing the 5-propoxyaniline-2,4-disulfonyl chloride and the cinnamoyl chloride employed in Example 3 by equivalent quantities of 5-methoxyaniline-2,4-disulfonyl chloride and phenylacetyl chloride and following substantially the same procedure described in Example 3, there is obtained 2,4-disulfamyl-5-methoxy-N-phenylacetylaniline.

EXAMPLE 7

*2,4-Disulfamyl-5-Methoxy-N-p-Chlorophenylacetylaniline*

By replacing the 5-propoxyaniline-2,4-disulfonyl chloride and the cinnamoyl chloride employed in Example 3 by equivalent quantities of 5-methoxyaniline-2,4-disulfonyl chloride and p-chlorophenylacetyl chloride and following substantially the same procedure described in Example 3, there is obtained 2,4-disulfamyl-5-methoxy-N-p-chlorophenylacetylaniline.

EXAMPLE 8

*2,5-Disulfamyl-4-Ethoxyaniline*

By replacing the m-anisidine employed in Example 1 by an equivalent quantity of p-ethoxyaniline and following substantially the same procedure described in Example 1, there is obtained 2,5-disulfamyl-4-ethoxyaniline.

EXAMPLE 9

*2,4-Disulfamyl-6-Methoxyaniline*

By replacing the m-anisidine employed in Example 1 by an equivalent quantity of o-anisidine and following substantially the same procedure described in Example 1, there is obtained 2,4-disulfamyl-6-methoxyaniline.

EXAMPLE 10

*2,4-Disulfamyl-5-Methoxy-N-Benzoylaniline*

By replacinng the 5-propoxyaniline-2,4-disulfonyl chloride and the cinnamoyl chloride employed in Example 3 by equivalent quantities of 5-methoxyaniline-2,4-disulfonyl chloride and benzoyl chloride and following substantially the same procedure described in Example 3, there is obtained 2,4-disulfamyl-5-methoxy-N-benzoylaniline.

EXAMPLE 11

*2,4-Di-(N-Acetylsulfamyl)-5-Methoxyacetanilide*

A mixture of 2,4-disulfamyl-5-methoxyaniline, prepared as described in Example 1, and an excess of acetic anhydride is treated with two drops of concentrated sulfuric acid. After about an hour the reaction mixture is cooled in ice and the precipitate collected on the filter and washed with water, yielding 2,4-di-(N-acetylsulfamyl)-5-methoxyacetanilide.

EXAMPLE 12

*2,4-Di-(1-Piperidylsulfonyl)-5-Methoxyaniline*

A mixture of 5-methoxyaniline-2,4-disulfonyl chloride and benzene is added dropwise over about 15 minutes to piperidine. After heating on the steam bath for 3 hours, the mixture is cooled and washed with two 50 ml. portions of water, one 50 ml. portion of dilute hydrochloric acid and then one 50 ml. portion of water. The benzene solution is dried over sodium sulfate and concentrated to dryness, yielding 2,4-di-(1-piperidylsulfonyl)-5-methoxyaniline.

EXAMPLE 13

*2,4-Di-(1-Pyrrolidyl)-5-Methoxyaniline*

By replacing the piperidine employed in Example 12 by pyrrolidine and following substantially the same procedure described in Example 12, there is obtained 2,4-di-(1-pyrrolidyl)-5-methoxyaniline.

EXAMPLE 14

*Sodium Salt of 2,4-Disulfamyl-5-Methoxyaniline*

2,4-Disulfamyl-5-methoxyaniline, obtained as described in Example 1, is dissolved in alcoholic sodium hydroxide (2 equivalents) and the solvent then evaporated in vacuo yielding the sodium salt of 2,4-disulfamyl-5-methoxy aniline.

EXAMPLE 15

*Pressed Tablets Comprising 0.5 g. Active Ingredients*

Ingredients:                                    Quantity grams
  2,4-disulfamyl-5-methoxyaniline _____ 500.0
  Stach paste 12½%, 100 cc., allow_____  12.5

Total _____ 512.5
  Starch, USP corn_____  25.0
  Magnesium stearate_____   5.5

Total _____ 543.0

The 2,4-disulfamyl-5-methoxyaniline is granulated with the starch paste and while moist passed through a No. 14 screen, dried at 45° C. for 20 hours and then passed three times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended after which the granulation is compressed into tablets using 14/32″ flat, bevelled, scored punch having a thickness of 0.205±0.005″ yielding 1,000 tablets, each weighing 0.543 grams and having a hardness of 6 kgs. measured by the Monsanto Chemical Company Tablet Hardness Tester Apparatus, and a disintegration time of 5 minutes when tested on the USP Tablet Disintegrating Apparatus (U.S. Pharmacopeia, 15th edition, page 937).

While the above examples describe the preparation of certain illustrative compounds represented by the general structure on page 1 and a certain specific dosage form suitable for administering the novel compounds of this invention in human therapy, it is to be understood that the invention is not to be limited by these examples or by the specific reaction conditions described for the preparation of the compounds or by the specific ingredients included in the pharmaceutical preparation, but is understood to embrace variations and modifications falling within the scope of the appended claims.

This application is a continuation-in-part of my co-pending U.S. application 638,701, filed February 7, 1957, which in turn was a continuation of U.S. Patent application 582,082, filed May 2, 1956, now Patent No. 2,809,194.

What is claimed is:

1. Disulfamylaniline derivatives having the formula

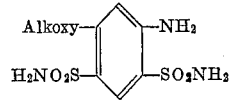

wherein the alkoxy substituent is a lower alkoxy.

2. 2,4-disulfamyl-5-methoxyaniline.

References Cited in the file of this patent
UNITED STATES PATENTS 2,289,029    Mietzsch et al. _____ July 7, 1942
2,773,061    Loop _____ Dec. 4, 1956